US 6,587,244 B1

(12) United States Patent
Ishinabe et al.

(10) Patent No.: US 6,587,244 B1
(45) Date of Patent: Jul. 1, 2003

(54) OPTICAL COMMUNICATION SYSTEM FOR SURVEY INSTRUMENT

(75) Inventors: Ikuo Ishinabe, Tokyo-to (JP); Kazuyoshi Yahagi, Tokyo-to (JP)

(73) Assignee: Kabushiki Kaisha TOPCON, Tokyo-to (JP)

(*) Notice: Subject to any disclaimer, the term of this patent is extended or adjusted under 35 U.S.C. 154(b) by 0 days.

(21) Appl. No.: 09/407,808

(22) Filed: Sep. 28, 1999

(51) Int. Cl.[7] .............................................. H04B 10/06
(52) U.S. Cl. ........................ 359/189; 359/566; 359/834; 356/4.01
(58) Field of Search ................. 359/189, 834, 359/529, 170, 195, 293, 831, 173, 159, 155, 558, 566; 356/5.01–5.15, 4.08, 141.1, 4.01; 33/293, 294, 295

(56) References Cited

U.S. PATENT DOCUMENTS

| 4,413,423 A | * | 11/1983 | Galvin | 33/1 SA |
| 4,829,172 A | * | 5/1989 | Miller | 250/205 |
| 5,051,934 A | * | 9/1991 | Wiklund | 356/152.3 |
| 5,537,110 A | * | 7/1996 | Iida et al. | 340/933 |
| 5,675,411 A | * | 10/1997 | Brooks et al. | 356/328 |
| 6,295,174 B1 | * | 9/2001 | Ishinabe et al. | 33/293 |
| 6,333,783 B1 | * | 12/2001 | Ohishi | 356/4.01 |
| 6,437,859 B1 | * | 8/2002 | Ohtomo et al. | 250/203.2 |

FOREIGN PATENT DOCUMENTS

| CH | 623 131 | | 5/1981 |
| EP | 0 992 814 A2 | * | 4/2000 |

* cited by examiner

Primary Examiner—Nina Tong
(74) Attorney, Agent, or Firm—Nields & Lemack

(57) ABSTRACT

The present invention provides an optical communication system, which comprises photodetection means for receiving communication light and optical means for forming an image from the communication light on the photodetection means, wherein the optical means is provided with a diffraction optical member having at least 0-th diffraction order.

5 Claims, 5 Drawing Sheets

OPTICAL COMMUNICATION SYSTEM FOR SURVEY INSTRUMENT

BACKGROUND OF THE INVENTION

The present invention relates to an optical communication system for a survey instrument with a built-in light wave range-finder for measuring a distance by projecting range-finding light.

In recent years, in the technical field of survey instrument, in particular, in the technical field of theodolite, the method to read the measuring angle has been changed from optical reading system to electrical reading system. Further, main stream in the technical field of survey instrument has been shifted to electronic type survey instrument. This electronic type survey instrument is provided with light wave range-finding function, i.e. light beam of range-finding light is projected toward a target object having a reflection prism for the measurement, and the range-finding light reflected from the target object is used to determine the distance. In some of the light wave range-finding survey instruments, there is provided an optical communication system, which synthesizes data for communication with the range-finding light to be projected and which is used to transmit various types of information such as data for working instruction, the results of measurement, etc. from the survey instrument to the target object side.

FIG. 4 shows an electronic type survey instrument and a target object provided with a reflection prism, by which range finding and setting of position are on.

In the figure, reference numeral 1 represents a survey instrument installed at a predetermined point, and a target object 2 of the survey instrument 1 is erected at the point of installation. The target object 2 comprises a prism unit 3 for reflecting range-finding light 5 toward the survey instrument 1 and a data communication unit 4.

From the survey instrument 1, collimation is preformed to the target object 2, and light wave distance measurement is carried out. The range-finding light 5 projected from the survey instrument 1 is reflected by the prism unit 3 of the target object 2. The reflected range-finding light is received by the survey instrument 1, and the distance is measured. The distance measurement is performed by several tens of times within a second, for example, and the average value is calculated and this is used as the measured value. In case the measured value is different from the desired preset value, an instruction to change position is issued to an operator who stands on the side of the target object 2.

The instruction for change is given by utilizing the range-finding light 5, and information on the instruction for change, i.e. survey data such as range-finding angle obtained at the survey instrument 1, data relating to setting position based on the survey data, e.g. movement in rightward direction, is synthesized with the range-finding light 5 by modulating the range-finding light 5, and the range-finding light 5 is transmitted to the target object 2 as light, which also serves as communication light.

The data communication unit 4 receives the range-finding light 5, and the information synthesized in the range-finding light 5 is separated and displayed. Or, communication is performed from the data communication unit 4 to the survey instrument 1 when necessary.

Referring to FIG. 5, description will be given now on a data communication unit 4 of a conventional type target object 2.

The data communication unit 4 primarily comprises a photodetection element 7, a signal detection unit 8, an arithmetic unit 9, a display unit 10, and an operation unit 11. The range-finding light 5 enters the photodetection element 7, and the photodetection element 7 converts photodetection signal by photoelectric conversion and outputs it to the signal detection unit 8. At the signal detection unit 8, data signal such as modulation signal is separated and detected from the photodetection signal, and it is outputted to the arithmetic unit 9. At the arithmetic unit 9, a required display such as the result of survey or instruction for working is displayed on the display unit 10 based on the data signal. The operation unit 11 inputs the data for change of display on the display unit 10 or the data to be transmitted to the survey instrument 1.

Referring to FIG. 6, description will be given on another type of data communication unit 13 of the conventional example.

The data communication unit 13 as shown in FIG. 6 has almost the same arrangement as the data communication unit 4 shown in FIG. 5, except that converging optical means 14 with a convex lens is provided in front of the photodetection element 7. By providing the converging optical means 14, the photodetection element 7 can serve well even when the distance to be measured is long where luminous fluxes of the range-finding light 5 are spread in wide range, or a smaller photodetection element 7 may be used.

In the data communication unit 4 shown in FIG. 5, incident range-finding light 5 consists of luminous fluxes which run approximately in parallel, and these light beams enter the entire surface of the photodetection element 7. The photodetection surface of the photodetection element 7 may be tilted with respect to the optical axis of the range-finding light. 5, but the tilting of the photodetection element 7 causes no special problem in the photodetection of the range-finding light 5, and it is advantageous in that visual field for photodetection or light receiving is wide. However, in case the distance between the survey instrument 1 and the target object 2 is long, luminous fluxes may be spread in wide range even if the range-finding light 5 are running almost in parallel. This means that amount of photodetection or received light of the photodetection element 7 is decreased. As a result, signal cannot be outputted to the signal detection unit 8. To increase the amount of photodetection or light receiving, photodetection area of the photodetection element 7 can be increased. However, the photodetection element 7 is expensive in cost, and larger photodetection element 7 means higher cost.

The data communication unit 13 shown in FIG. 6 is provided with the converging optical, means 14, and the survey instrument 1 is positioned at long distance. In this respect, it is advantageous in that sufficient light amount can be obtained to output signal from the photodetection element 7 to the signal detection unit 8 because luminous fluxes are converged by the converging optical means 14 even when luminous fluxes of the incident range-finding light 5 may be spread in wide range. However, in case the survey instrument 1 and the data communication unit 13 are deviated from the front and an incident optical axis of the range-finding light 5 is tilted with respect to the optical axis of the converging optical means 14, the light converging position of the range-finding light 5 is moved, and the light cannot be received by the photodetection element 7. As shown in FIG. 4, the data communication unit 4 is arranged at a position adjacent to the prism unit 3. When the distance between the survey instrument 1 and the target object 2 is relatively short, there arises the problem that deviation of the optical axis cannot be avoided or data communication cannot be achieved between the survey instrument 1 and the target object 2 in some cases.

SUMMARY OF THE INVENTION

It is an object of the present invention to provide an optical communication system, by which it is possible to ensure the satisfactory performance of data communication between the survey instrument 1 and the target object 2 in case of short distance or long distance without designing the photodetection element 7 in larger size.

The optical communication system for a survey instrument according to the present invention comprises photodetection means for receiving communication light and optical means for forming an image of the communication light on the photodetection means, wherein the optical means is provided with a diffraction optical member having at least 0-th diffraction order. The optical communication system for a survey instrument according to the present invention comprises a data communication unit positioned adjacent to a prism unit, the data communication unit receives light beam for data communication projected from the survey instrument, and communication data is detected according to a photodetection signal based on the result of photodetection, wherein the data communication unit is provided with a photodetection element for receiving light beam for the data communication, and a diffraction optical member is arranged on front surface of the photodetection element. Further, the present invention provides the optical communication system for a survey instrument as described above, wherein the diffraction optical member forms at least 0-th diffraction order and 1st diffraction order on the photodetection means. Also, the present invention provides the optical communication system for a survey instrument as described above, wherein the diffraction optical member is a Fresnel lens. Further, the present invention provides the optical communication system for a survey instrument as described above, wherein the diffraction optical member is a diffraction grating. Also, the present invention provides the optical communication system for a survey instrument as described above, wherein the optical communication system comprises an LED lamp to show photodetection state. The diffraction optical member as described above transmits 0-th diffraction order, i.e. parallel components of light beam, without change and also has converging action, and this means that sufficient amount of light enters the photodetection element even when the distance between the survey instrument and the target object is relatively short and incident light to the photodetection element is tilted or even when the distance is long.

DETAILED DESCRIPTION OF THE PREFERRED EMBODIMENT

In the following, description will be given on an embodiment of the present invention referring to the attached drawings.

Figure 1:
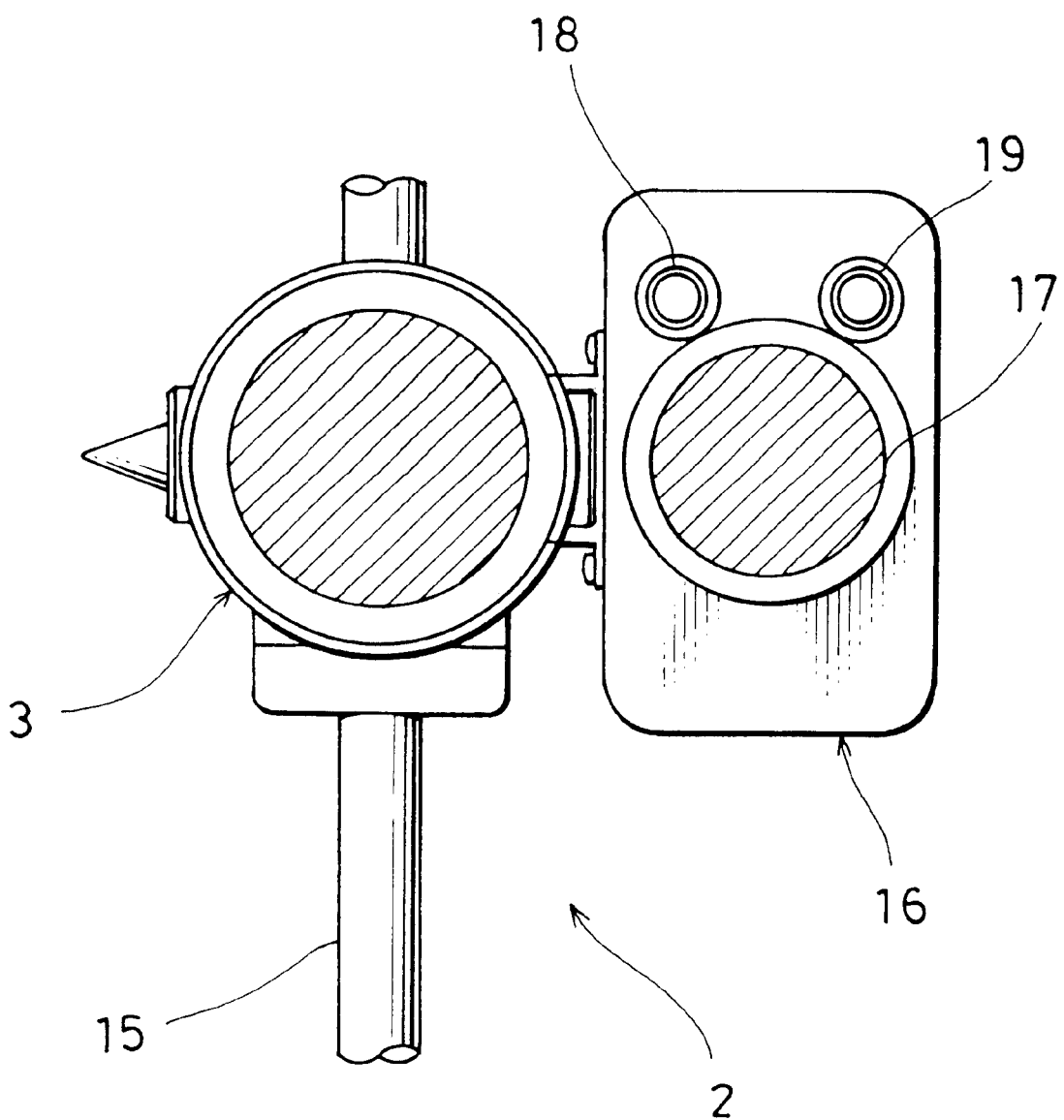
FIG. 1 is a front view of an embodiment of the present invention.

First, referring to FIG. 1, description will be given on general features of a target object 2 of an optical communication system according to an embodiment of the present invention.

A prism unit 3 is slidably mounted on a pole 15, and a data communication unit 16 is arranged at a position adjacent to the prism unit 3. The data communication unit 16 may be arranged integrally with the prism unit 3 or it may be removably mounted on the prism unit 3.

A photodetection window (or light receiving window) 17 is arranged on a front surface of the data communication unit 16, and an optical axis of the photodetection window 17 is on the same horizontal plane as the optical axis of the prism unit 3. In front of the data communication unit 16, light emitting elements 18 and 19 for confirming photodetection are provided in order to confirm whether data has been received or not. One of the light emitting elements 18 and 19 for confirming photodetection, i.e. the light emitting element 18, is an LED, which is turned on in red color showing that light is received, and the other, i.e. the light emitting element 19, is an LED, which is turned on in orange color showing the condition that light is not received.

Figure 2:
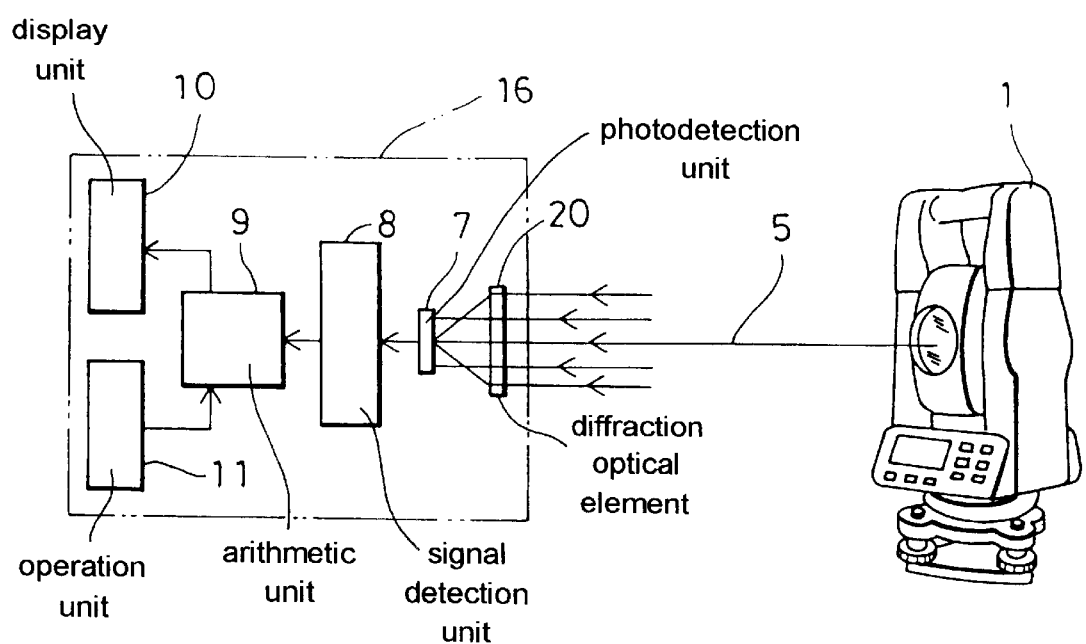
FIG. 2 is a schematical block diagram of a data communication unit of the above embodiment.
Figure 5:
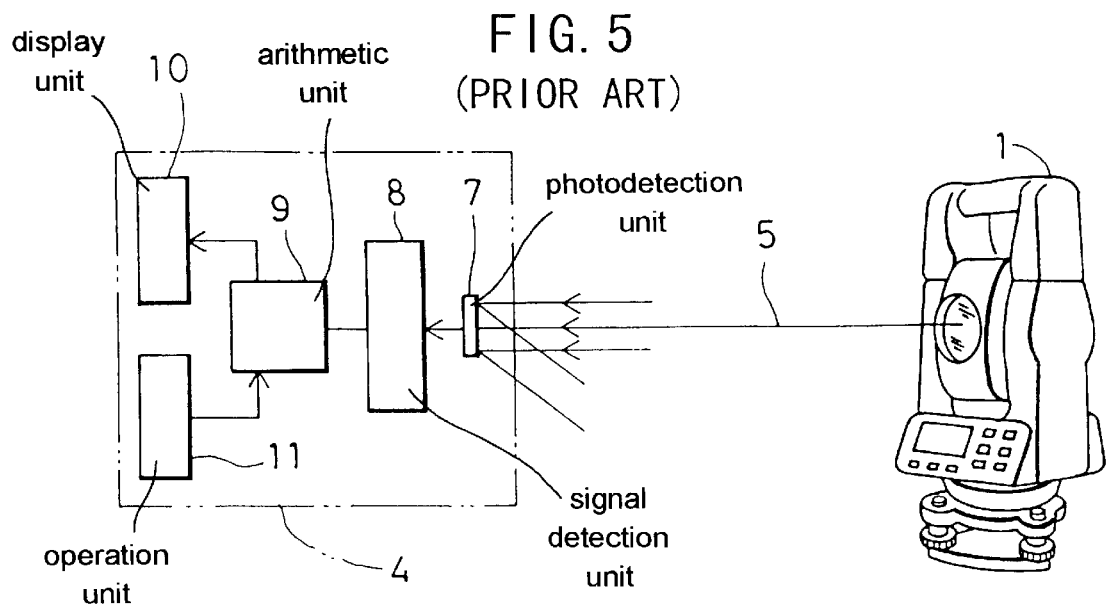
FIG. 5 is a schematical block diagram of a data communication unit of a conventional example.
Figure 6:
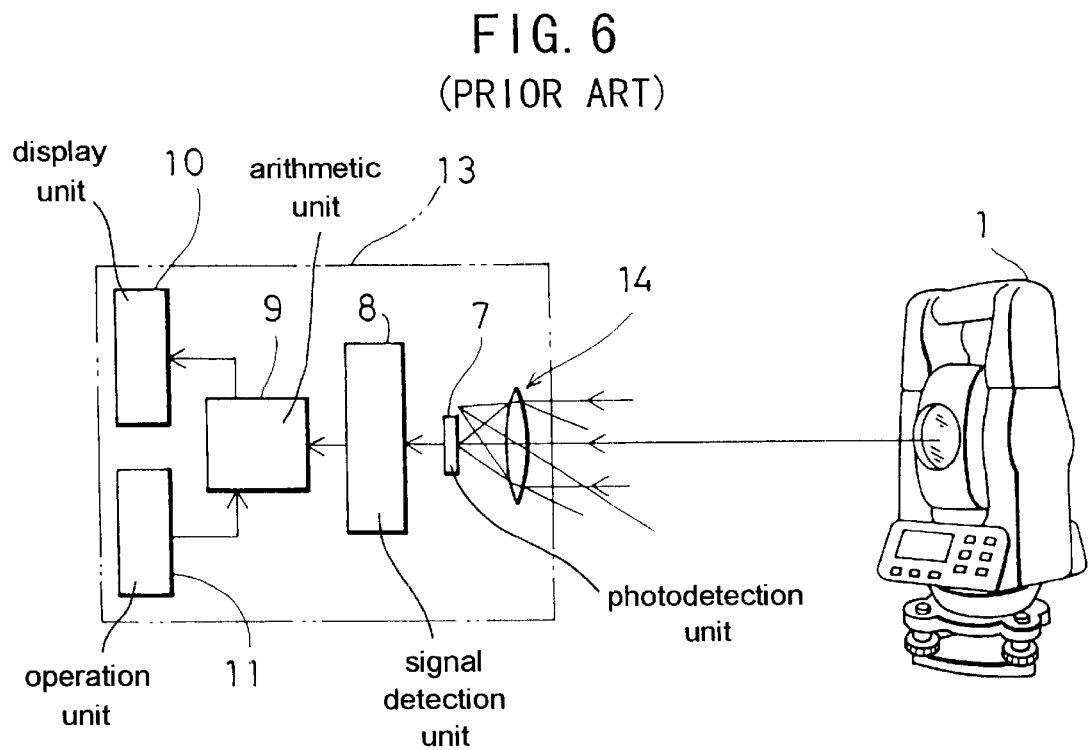
FIG. 6 is a schematical block diagram of another data communication unit of the conventional example.

FIG. 2 is a schematical block diagram of the above data communication unit 16. In FIG. 2, the same component as in FIG. 5 is referred by the same symbol, and detailed description is not given here.

The principal arrangement of the data communication unit 16 is the same as the data communication unit 4 as described above. It comprises a photodetection element 7, a signal detection unit 8, an arithmetic unit 9, a display unit 10, and an operation unit 11. When the range-finding light 5 enters the photodetection element 7, it is converted by photoelectric conversion and is outputted to the signal detection unit 8 as a photodetection signal. At the signal detection unit 8, data signal such as modulation signal is separated and detected from the photodetection signal, and it is outputted to the arithmetic unit 9. At the arithmetic unit 9, a required display, e.g. a display of the result of survey or a display of working instruction, is displayed on the display unit 10 based on the data signal, and the operation unit 11 inputs data for change of the display on the display unit 10 or for transmission to the survey instrument 1.

On the front surface (on the photodetection window 17) of the photodetection, element 7, a photodetection optical means provided with a diffraction optical member 20 is disposed.

The diffraction optical member 20 has a function to converge light and also has a function to transmit parallel light components among the incident light beams. Therefore, when range-finding light 5 enters the diffraction optical member 20 in oblique direction from near distance, parallel light components pass through the diffraction optical member 20 and reach the photodetection element 7. In case where the distance is short, spreading of luminous fluxes is narrow, and luminous flux density is high. Even when the parallel light components are a part of the range-finding light 5, it has sufficient amount of light to operate the photodetection element 7.

Next, when the distance between the survey instrument 1 and the target object 2 are relatively long and when luminous fluxes of the range-finding light 5 enter the diffraction optical member 20 in spread state, the diffraction optical member 20 converges the range-finding light 5 to photodetection surface of the photodetection element 7. Accordingly, even in case of long distance, sufficient amount of light enters the photodetection element 7.

Figure 3:
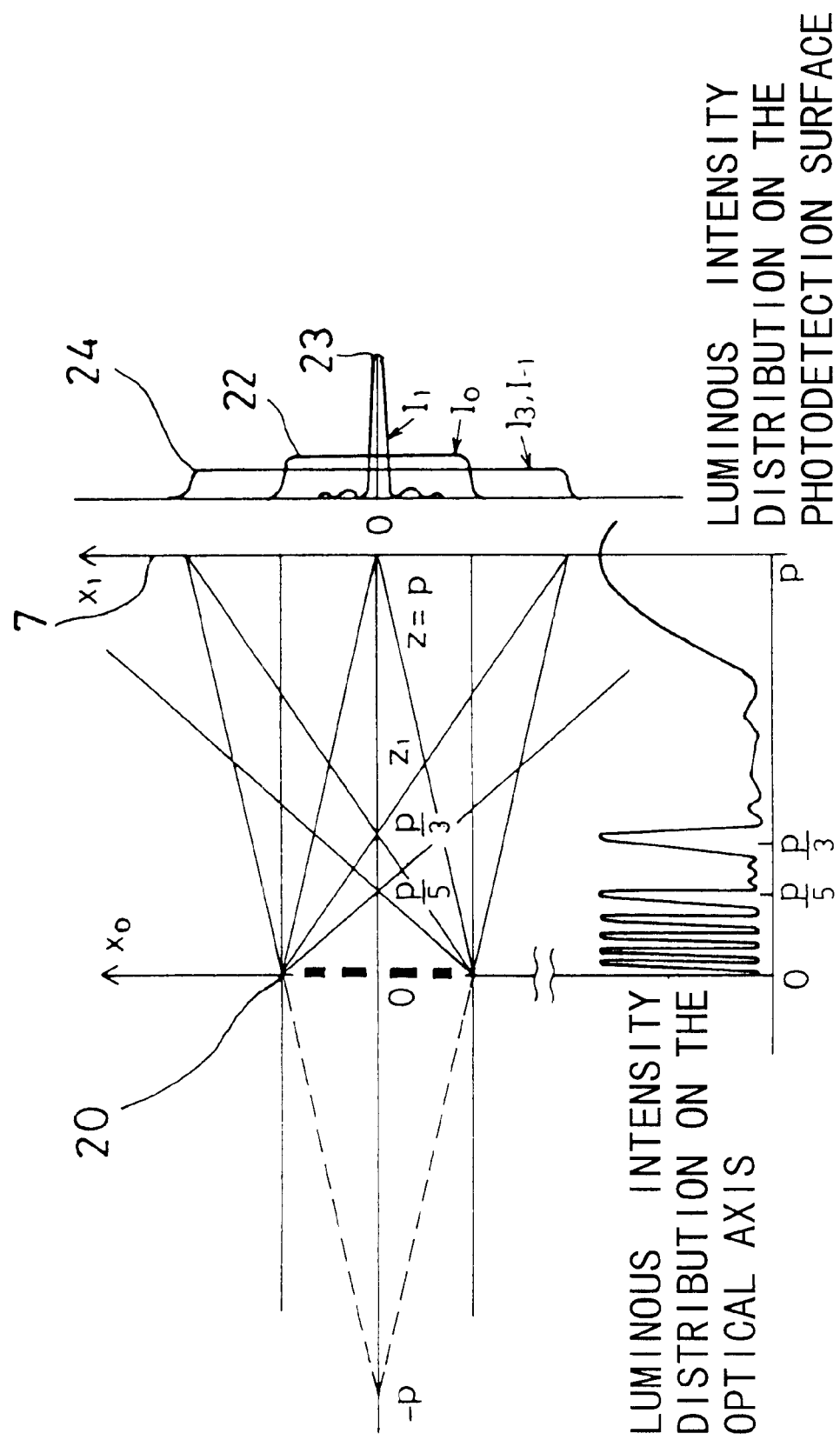
FIG. 3 is a drawing to explain light converging condition of a diffraction optical member used in the above embodiment.
Figure 4:
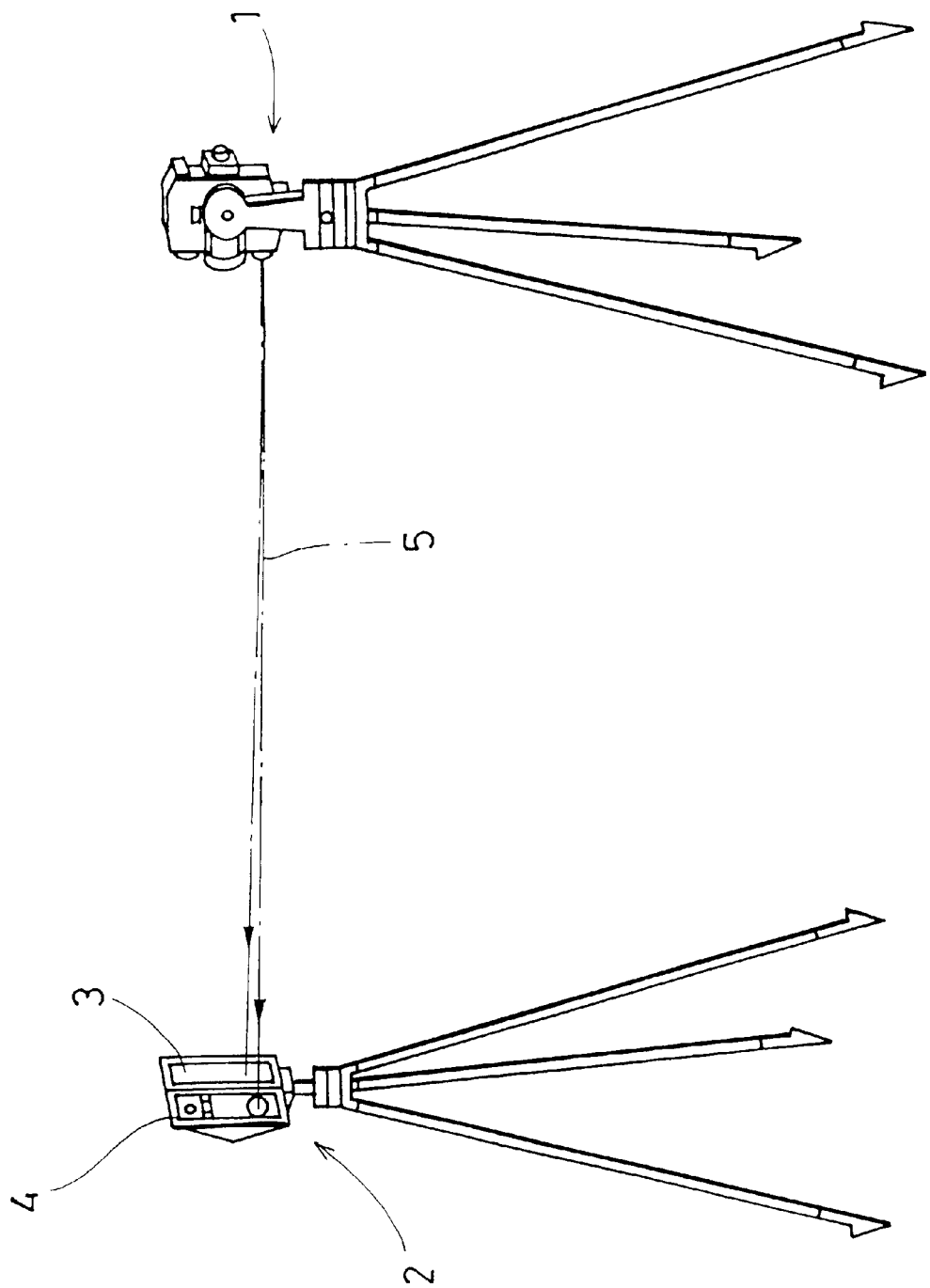
FIG. 4 is a drawing to explain a survey instrument and a target object.

FIG. 3 shows luminous intensity distribution of the luminous fluxes which have passed through the diffraction optical member 20 and are converged to the photodetection surface of the photodetection element 7. In FIG. 3, reference symbol "p" indicates a focal point of the diffraction optical member 20.

The parallel light components of the range-finding light 5, which have passed through the diffraction optical member 20, reach the photodetection surface of the photodetection element 7. The luminous intensity distribution is shown as 0-th diffraction order luminous intensity distribution 22. The luminous flux, converged by converging action of the diffraction optical member 20 is indicated as 1st diffraction order luminous intensity distribution 23. Further, the luminous flux, which has been dispersed by diffracting action of the diffraction optical member 20 and passed through, is shown as 2nd diffraction order luminous intensity distribution 24.

As it is evident from the luminous intensity distribution on the photodetection surface in FIG. 3, even in case the optical axis is tilted and luminous flux shown in the 1st diffraction order luminous intensity distribution 23 does not enter the photodetection surface, the luminous fluxes shown in 0-th diffraction order luminous intensity distribution 22 or in 2nd diffraction order luminous intensity distribution 24 enter the photodetection element 7. In particular, by the luminous flux shown in 0-th diffraction order luminous intensity distribution 22, sufficient amount of light can be received. When the optical axis is not tilted, the converged luminous fluxes shown in 1st diffraction order luminous intensity distribution 23 enter the photodetection element 7, and, sufficient photodetection amount can be obtained even in case of long distance and even when luminous fluxes of the range-finding light 5 are spread widely.

As a concrete example of diffraction optical member 20, a Fresnel lens or a diffraction grating is used.

In the embodiment as described above, the range-finding light 5 is used as laser beam for data communication, while track light or projection light may be used for data communication. Further, not only the target object combined with the prism, but the data communication unit may be used alone, or the data communication unit may be arranged on the survey instrument side.

According to the present invention, even when the target object and survey instrument are at near distance or at long distance, or even when an incident optical axis to the data communication unit is tilted, data communication using light as the medium can be carried out without any trouble.

What is claimed is:

1. An optical communication system for a survey instrument capable of optical communication to a target object which comprises data communication means, wherein said data communication means of said target object comprises photodetection means for receiving communication light which is projected from said survey instrument and a diffraction optical member for directing said communication light onto said photodetection means, wherein said diffraction optical member transmits parallel light components of communication light without change and has a converging function having at least $0^{th}$ diffraction order.

2. An optical communication system for a survey instrument according to claim 1, wherein said diffraction optical member forms at least 0-th diffraction order and 1st diffraction order on the photodetection means, and the photodetection means can receive 0-th diffraction order and 1st diffraction order.

3. An optical communication system for a survey instrument according to claim 1, wherein said diffraction optical member is a Fresnel lens.

4. An optical communication system for a survey instrument according to claim 1, wherein said diffraction optical member is a diffraction grating.

5. An optical communication system for a survey for a survey instrument according to claim 1, wherein there is provided an LED lamp which is turned or when light is received after transmission of said diffraction optical member and an LED lamp which is turned on under the condition that light is not received.

* * * * *